United States Patent
Chantrain et al.

(10) Patent No.: US 7,117,195 B2
(45) Date of Patent: Oct. 3, 2006

(54) METHOD FOR DEPLOYING A SERVICE AND A METHOD FOR CONFIGURING A NETWORK ELEMENT IN A COMMUNICATION NETWORK

(75) Inventors: Dominique Chantrain, Edegem (BE); Michel Van Ackere, Sint-Niklaas (BE); Hans Vanderstraeten, Lebbeke (BE); Lieven Trappeniers, Leuven (BE); Jan De Moerloose, Lovendegem (BE); Stéphane Focant, Etterbeek (BE); Claudine Batsleer, Scheldewindeke (BE); Hien Thong Pham, Brussels (BE)

(73) Assignee: Alcatel, Paris (FR)

( * ) Notice: Subject to any disclaimer, the term of this patent is extended or adjusted under 35 U.S.C. 154(b) by 488 days.

(21) Appl. No.: 10/128,462

(22) Filed: Apr. 24, 2002

(65) Prior Publication Data

US 2002/0194323 A1 Dec. 19, 2002

(30) Foreign Application Priority Data

Jun. 6, 2001 (EP) .................................. 01440156

(51) Int. Cl.
G06F 17/30 (2006.01)
G06F 15/177 (2006.01)

(52) U.S. Cl. ........................ 707/1; 709/220; 709/221

(58) Field of Classification Search ................ 707/1–2, 707/100; 709/201, 220, 221, 223, 225
See application file for complete search history.

(56) References Cited

U.S. PATENT DOCUMENTS

| 6,222,843 | B1 | 4/2001 | Mauger |
| 6,229,810 | B1 | 5/2001 | Gerszberg et al. |
| 6,230,194 | B1 | 5/2001 | Frailong et al. |
| 6,237,031 | B1 | 5/2001 | Knauerhase et al. |
| 2002/0194317 | A1* | 12/2002 | Kanada et al. .............. 709/223 |
| 2003/0187993 | A1* | 10/2003 | Ribot .......................... 709/227 |

FOREIGN PATENT DOCUMENTS

EP 1 069 746 A1 1/2001

* cited by examiner

Primary Examiner—Alford W. Kindred
(74) Attorney, Agent, or Firm—Sughrue Mion, PLLC (57) ABSTRACT

A method for deploying a service in a communication network by performing the steps of: invoking a service deployment engine by a request for the service, retrieval of deployment templates, retrieval of service deployment policies, determination of a current configuration of at least one network element involved in providing the service, and selection of a deployment template from the retrieved deployment templates based on the service deployment policies and configuration. Further, a method for configuring a network element via a network element controller through the intermediary of a network element proxy.

8 Claims, 10 Drawing Sheets

METHOD FOR DEPLOYING A SERVICE AND A METHOD FOR CONFIGURING A NETWORK ELEMENT IN A COMMUNICATION NETWORK

FIELD OF THE INVENTION

The present invention relates to a method for deploying a service in a communication network and a method for configuring a network element in a communication network as well as to a corresponding distributed computer system and computer program product.

BACKGROUND AND PRIOR ART

Telecommunication networks such as the internet are an increasingly important source of information and electronic communication for users of computers in homes and businesses. A major problem associated with the internet, however, is the difficulty faced by typical computer users in connecting their computers or local area networks to the internet. For example, a computer user desiring to connect to the internet must make many critical decisions, such as which communication medium to use, which internet service provider to subscribe to, how to secure the network interface and which network services to utilize.

Likewise business managers in charge of local or wide area networks must also address questions related to the type and configuration of computer networks which are to be connected to the internet, and other such external networks. Installing an external network connection typically requires an understanding of many different communication protocols, network services, connection media and computer network practices.

This complexity is further increased by the increasing numbers of types of network elements, functionalities, protocols and services etc.

U.S. Pat. No. 6,230,194 discloses a system for upgrading the software contents of a network interface device connecting a client computer system to an external network. The network interface device is configured for the client system by automated procedures and protocols initiated from a remote server. Software programs within the network interface device provide transparent communication between the client computer system and services available on the external network. Similar software programs and a configuration database within the network interface device provide transparent communication between the client computer system and the remote server.

U.S. Pat. No. 6,237,031 discloses a system for dynamically controlling a network proxy. Network proxies are configured to have free access to both internal LAN resources and external resources, and can safely pass data back and forth across a firewall. Users may then be given safe, though indirect, access to web resources by configuring the user's web browser to reference the network proxy instead of external target servers. When the web browser is used to retrieve information from outside the firewall it sends a request to the network proxy, which then completes the request and returns the result to the requester.

U.S. Pat. No. 6,222,843 discloses a method for providing services in a telecommunication network. The method relies on an open services architecture incorporating an adaptive grooming router providing an interconnected backbone network function for connectivity between a plurality of multimedia access routers and a narrow band network, wherein the multimedia access routers provide each a hub point.

U.S. Pat. No. 6,229,810 shows a network server platform for a local loop network service architecture. The network service platform aims to address the problem that DSL modem technology is not standardized. In order to ensure compatibility the type of DSL modem provided by a local telephone company must also be provided to the end user in the customer premises equipment. Additionally, since the network is not completely controlled by the inter-exchange companies, it is difficult for the inter-exchange companies to provide data at committed delivery rates.

Therefore, it is a common problem of the prior art to manage the configuration of network elements for the purposes of deploying services over a communication network both from the perspective of the end user and for the service provider.

SUMMARY OF THE INVENTION

It is therefore an object of the present invention to provide an improved method for deploying a service and for configuring a network element in a communication network as well as a corresponding computer system and computer program product.

These objects are achieved by: a method for deploying a service in a communication network, the method comprising the steps of: invoking a service deployment engine by a request for the service, retrieval of deployment templates by the service deployment engine, selection of a deployment template from the retrieved deployment templates by the service deployment engine, deploying the service by means of the selected deployment template; by a service deployment engine comprising means for performing this method; by a computer system comprising a such a service deployment engine and at least one network element controller for effecting the deployment of the requested service; by a method for configuring a network element comprising the steps of providing for each network element type a network element proxy located between network elements of the same type and a network element controller, sending a configuration command from the network element controller to the network element proxy of the network element to be configured, translating the configuration command into a lower level format for the configuration of the network element, and providing the lower level format of the configuration command to the network element, by a distributed computer system having components for implementing these features, and by a computer program product stored on a computer readable medium, such as on a data file for transmission over the internet, comprising computer readable program for causing a distributed computer system to implement these features when the program is run on the distributed computer system.

Further features and advantages of the invention will be discussed below.

The invention allows one to select and activate a service in a user-friendly and efficient way. In particular, the usage of deployment templates makes it possible to automatically configure the network elements required for providing a requested service both within the network itself and within the customer premises domain. The deployment can be user-initiated, fully automated and properly accounted for while corresponding deployment policies of the network operator and/or service provider are observed.

This has the advantage that the deployment of a service and the corresponding changes of the configurations of network elements do not require manual intervention of an operator such as running scripts on the individual network elements involved.

As a further advantage, the invention allows to bundle services into one offer. When the bundle of services is selected by a user, the whole bundle is automatically deployed. This is even made possible by the present invention within a heterogeneous installed base of network elements.

Further, the invention is advantageous in that it allows configuration of network elements by means of a network element proxy. When a network element controller receives a request for configuring a network element, this request is translated by the network element proxy into a lower-level format, for example a lower-level handle, methods and parameters which can be interpreted by the network element to be configured. The network element proxy can be a part of the network element controller, a separate entity or it can be on the network element itself. A network element proxy can deal with one or multiple network elements.

Configuring a network element through the intermediary of a network element proxy has the advantage that access- and service-providers can allow their end customers to configure their customer premises gateway without risk for stability, manageability and with respect to security.

In particular, this allows one to effect a configuration change upon service selection in compliance with network and/or service provider's policies. Further, this offers the possibility of bookkeeping of the configuration of the network elements in the network element proxy.

The flexible architecture devised by the invention can be applied to an existing installed base of network elements. As a further advantage, the invention allows accounting for the services provided to end users on a finer level of granularity.

BRIEF DESCRIPTION OF THE DRAWINGS

In the following, a preferred embodiment of the invention will be explained in greater detail with respect to the drawings, in which.

DETAILED DESCRIPTION OF THE INVENTION

Figure 1:
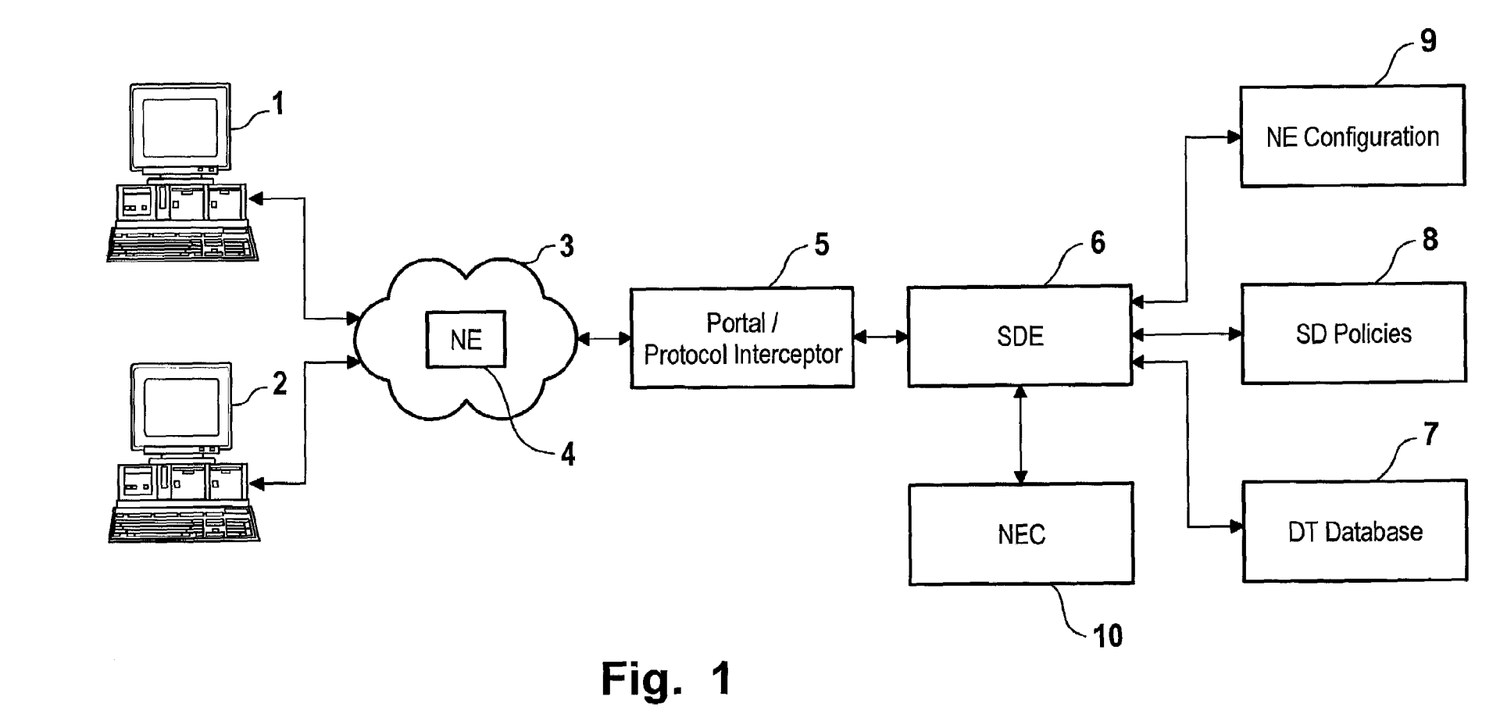
FIG. 1 is a block diagram of a first embodiment of a computer system in accordance with the invention.

FIG. 1 shows a distributed computer system containing client computer systems 1 and 2 which are on the same or on different premises. The client computers 1 and 2 are connected to a communication network 3. The communication network 3 can encompass a customer premises network and/or an external network, such as the internet.

The communication network 3 has a variety of network elements such as network element 4. Examples for network elements include an ADSL (asymmetric digital subscriber line) modem, a digital subscriber line equipment (DSLAM) of an access provider and broadband access servers (BRAS).

The client computers 1 and 2 can connect to a portal 5 which is realized on a web-site. The portal 5 can trigger a service deployment engine (SDE) 6. Alternatively the service deployment engine 6 can be invoked by a protocol interceptor. The function of the protocol interceptor is to intercept protocol messages exchanged between two network elements and to reroute these protocol messages. In this way, triggers from the network can be intercepted and can be used to trigger the service deployment engine 6.

The service deployment engine 6 is coupled to databases 7, 8 and 9.

The database 7 contains deployment templates for deployment of a variety of services on a variety of network elements. Each of the templates of the database 7 contains handles, methods and/or parameters for a specific configuration and/or activation of a service.

The database 8 is a database containing service deployment policies for a variety of services.

Preferably, the policies are stored in the form of a policy information model which defines policy objects that enable application developers, network administrators and policy administrators to represent policies of different types.

Each policy rule can consist of a set of conditions and a set of actions. Policy rules may be aggregated into policy groups. These groups can be nested to represent a hierarchy of policies.

If the set of conditions associated with a policy rule evaluates to TRUE, then a set of actions that either maintain the current state of the object or transition the object to a new state may be executed.

For the set of actions associated with a policy rule, it is possible to specify an order of execution, as well as an indication of whether the order is required or merely recommended. It is also possible to indicate that the order in which the actions are executed does not matter.

Policy rules themselves can be prioritized. One common reason for doing this is to express an overall policy that has a general case with a few exceptions.

For example, a general quality of service policy rule might specify that traffic originating from members of the engineering group is to get "Bronzeservice". A second policy rule might express an exception: traffic origination from John, a specific member of the engineering group, is to get "Goldservice". Since traffic originating from John satisfies the conditions of both policy rules, and since the actions associated with the rules are incompatible, a priority needs to be established.

Further examples for policy groups and rules, such as motivational policies, configuration policies, installation policies, error and event policies, usage policies, and services policies are given in RFC3060, policy core information model, version 1, specification, network working group of the IETF policy framework WG (http://www.faqs.org/rfcs/rfc3060.html).

The database 9 contains information descriptive of the configuration of the network elements.

The services deployment engine 6 is also connected to a network element controller 10.

In operation, the service deployment engine 6 is triggered when a user of one of the client computers 1 or 2 makes a selection in the portal 5. For example the user may select a service or a service-category (silver/gold/bronze) on the portal 5. Alternatively, the service deployment engine 5 can be triggered by a protocol interceptor (PI) that captures a request—such as a request for a point to point protocol (PPP) set-up, a radius message or a DNS request. The protocol interceptor is not necessarily related to the portal 5.

After it has been triggered the SDE 6 retrieves the appropriate deployment template (s) from the database 7. The retrieved template (s) identify the involved network elements for configuring the requested service.

The SDE consults the database 8 in order to obtain the service deployment policies of the operator or service-provider. Subsequently, the SDE 6 determines the current configuration of the network elements involved in the requested service. In the example considered here this is done by accessing the network element configuration database 9 in which the configurations of the network element are stored.

Alternatively, this information can be obtained by the SDE 6 by means of an active interrogation of the involved network elements. Based on the information obtained from the databases 8 and 9 or by the information obtained by interrogating the network elements, a deployment template is selected by the SDE 6.

At this stage the SDE 6 has all elements which are necessary to deploy and/or activate the requested services for the user: the appropriate deployment template and the identity of the network elements which are involved.

An example for such a user request is a request for deployment of a virtual private network switch (VPN) service. This services can be deployed in at least three ways: (i) putting corresponding functionality on the client's terminal side, (ii) putting functionality on the modem on the client's side or (iii) keeping all of the required functionality in the network. Hence, when a user of one of the client computers 1 or 2 issues a request for this service, the database 7 will return at least three different deployment templates, each one of the deployment templates corresponding to one of the above listed technically feasible possibilities.

The SDE 6 queries the database 8 in order to determine the service deployment policy and database 9 to determine the configuration of the network elements involved.

By way of the example it is assumed that the client's side has an advanced type of customer premises (CP) gateway that allows to deploy services on it. In this case all theoretically feasible deployment templates are still viable as the client's CP gateway technically allows to realize all options. In contrast, a less advanced modem would have eliminated the possibility (ii).

As more than one deployment template can be used for deployment of the service the retrieved operator service deployment policy is decisive for the selection of the service deployment template by the SDE 6.

For example, the service deployment policy of the operator might specify that putting software on the user terminal of the client's side (above option (i)) is to be avoided if possible. As a consequence, the deployment template corresponding to above possibility (ii) or (iii) is selected by the SDE 6 and the service is deployed correspondingly.

This is done by configuring the involved network elements in accordance with the selected deployment template by the SDE 6. In the preferred embodiment considered here the SDE 6 interacts with the network element controller 10 to use the appropriate handles as specified in the selected deployment template for the network element to be configured, taking into account the existing configuration of the network elements. In this instance, the network element controller 10 performs the actual configuration of the network element to be configured. This can be done with the help of network element proxies that translate the high-level handles to lower-level handles that are specific to the network element and/or the network element type involved.

Figure 2:
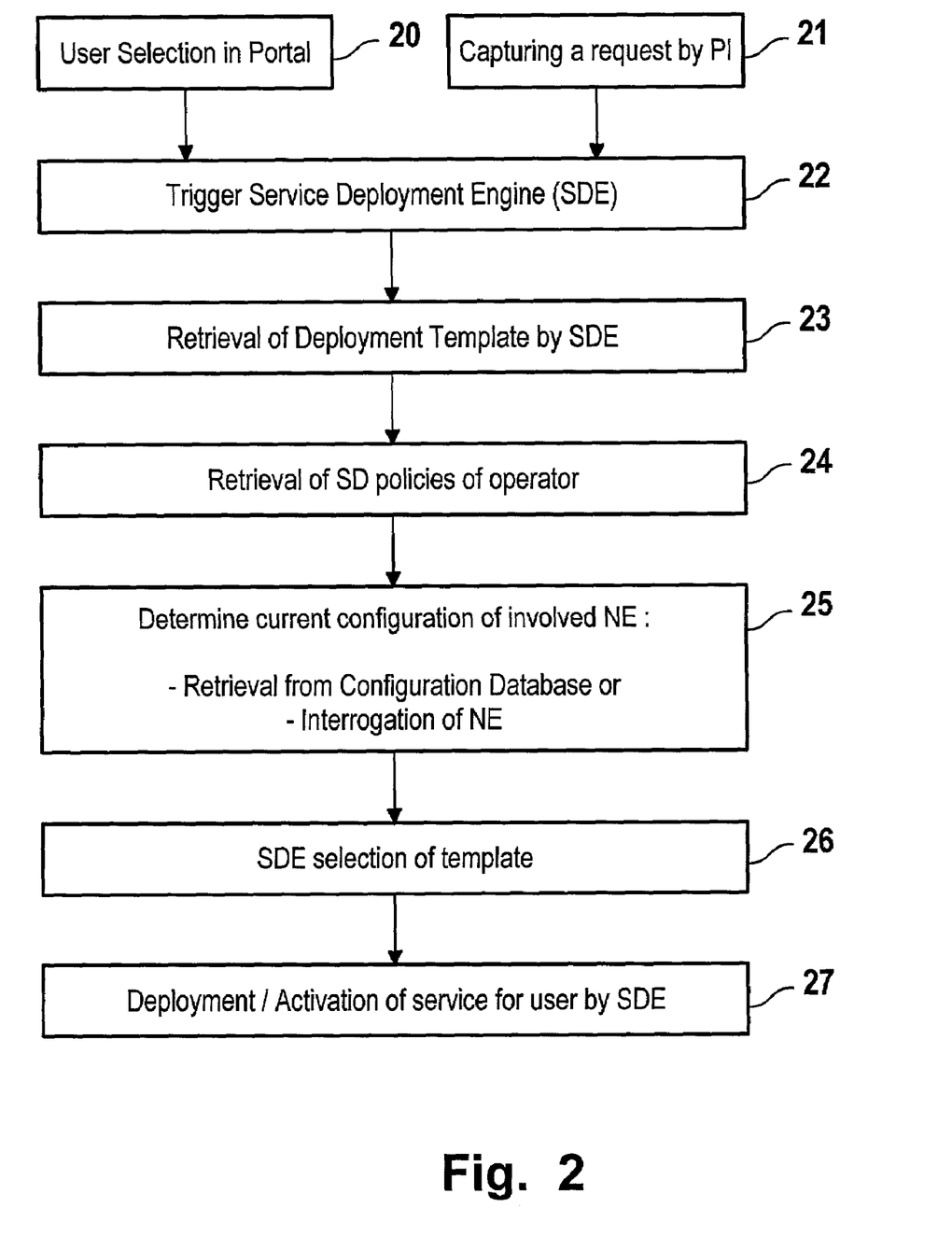
FIG. 2 is a flowchart illustrative of an embodiment of a method for deploying a service in a communication network of the invention.

FIG. 2 shows a flowchart corresponding to the operation of the above described distributed computer system of FIG. 1.

In step 20 the user performs a selection in a portal to request a desired service. In step 22 this triggers the service deployment engine.

Alternatively, the service deployment engine can be triggered in step 22 by capturing the service request by means of a protocol interceptor in step 21.

In step 23 the SDE retrieves the deployment templates from a database. In step 24 it also retrieves the corresponding service deployment policies of the operator and in step 25 the configuration of the involved network elements from another database. The involved network elements are identified in the deployment template. Alternatively, the involved network elements can be directly interrogated in step 25 in order to determine the current configuration.

Based on the information obtained in steps 24, 25 and 26, a deployment template is selected by the SDE in step 26. For example, this selection can be performed by selecting a deployment template from the set of deployment templates which corresponds both to the retrieved service deployment policies and to the current properties and/or configuration of the involved network elements. For example, a legacy network element might not support one or more of the available configuration option of the deployment templates. This restricts the number of deployment templates which can be selected by the SDE. Likewise, the service deployment policies of the operator can impose restrictions on the SDEs selection of the appropriate deployment template.

After the selection of the deployment template has been made in step 26, the deployment and/or activation of the service is effected under control of the SDE in step 27.

Figure 3:
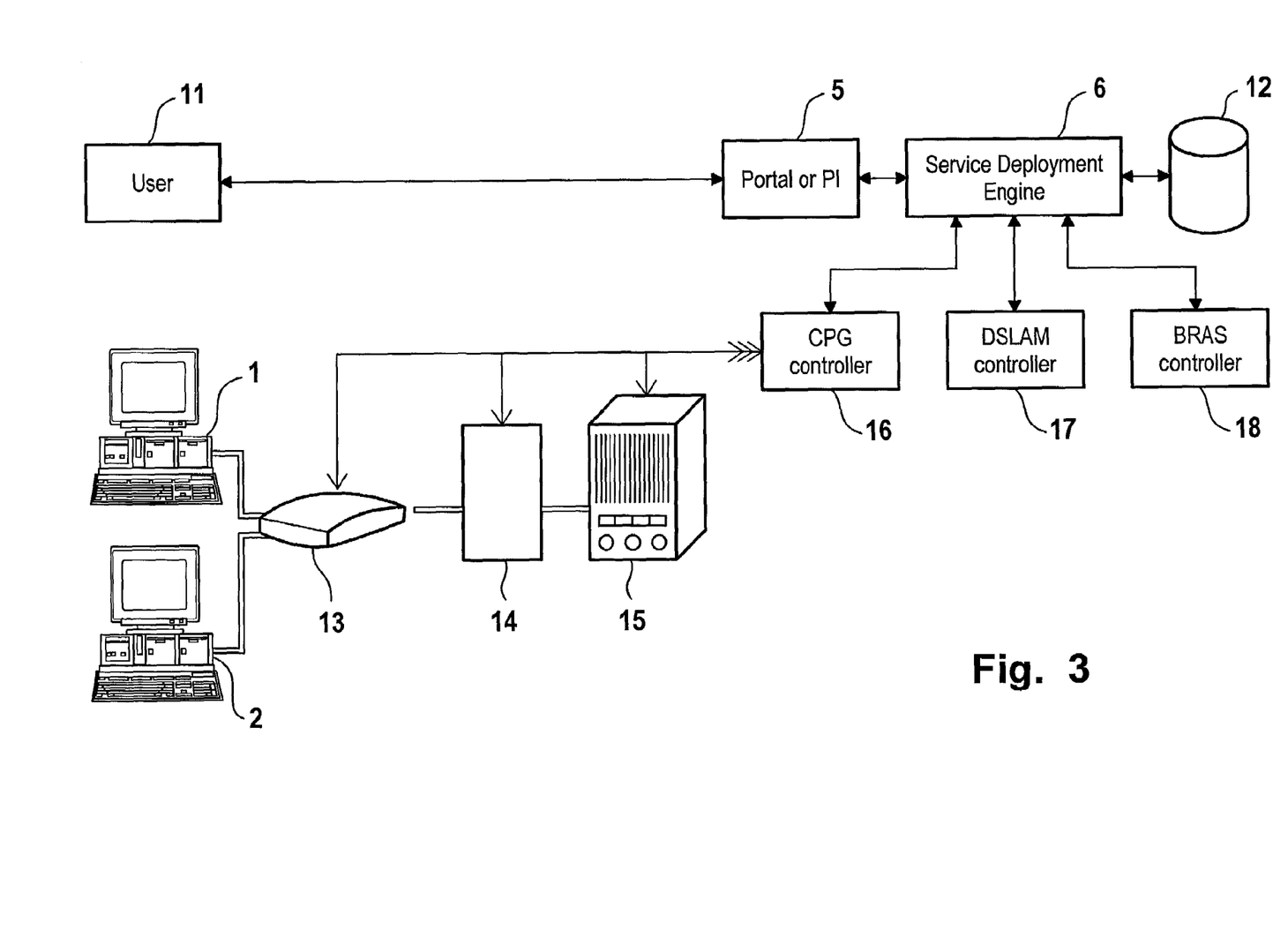
FIG. 3 is a block diagram of a second embodiment of a computer system in accordance with the invention, FIGS. 4 a–c show three different approaches for a protocol interceptor as it can be used for the embodiments of FIG. 1, 2 or 3.

FIG. 3 shows a more specific preferred embodiment of the computer system of FIG. 1 where like elements are denoted with the same referenced numerals. A user 11 connects to a portal 5 by means of a client computer 1 or a client computer 2 on its customer premises. The service deployment engine 6 in this instance is connected to a single database 12 incorporating the databases 7, 8 and 9 of FIG. 1.

The client computers 1 and 2 are connected to a customer premises gateway 13 (CP gateway). The CP gateway 13 is connected to DSLAM 14 which in turn is connected to BRAS 15. Each of the network elements 13, 14 and 15 is associated with a corresponding network element controller—CP gateway controller 16, DSLAM controller 17 and BRAS controller 18. These network element controllers 16, 17 and 18 are coupled to SDE 6.

Hence the configuration of CP gateway 13 is performed by SDE 6 through the intermediary of the corresponding network element controller which is CP gateway controller 16. Likewise DSLAM controller 17 and BRAS controller 18 are utilized by SDE 6 for the configuration of DSLAM 14 and BRAS 15.

In the following a preferred embodiment for the protocol interceptor is shown in greater detail with respect to the FIGS. 4 *a–c*. The function of the protocol interceptor is to intercept protocol messages exchanged between two network elements and reroute theses messages. In this way, triggers from the network to the SDE 6 (cf. FIGS. 1, 3) can be intercepted and used in an application framework. Also, messages going to another destination can be used to generate the trigger for the SDE 6.

The protocol interceptor may further contain an algorithm to decide for each message how it has to be processed. It contains further a control interface through which it can be flexibly adapted, (e.g. when a new system is introduced in the network architecture which also desires to receive the messages).

Figure 4A:
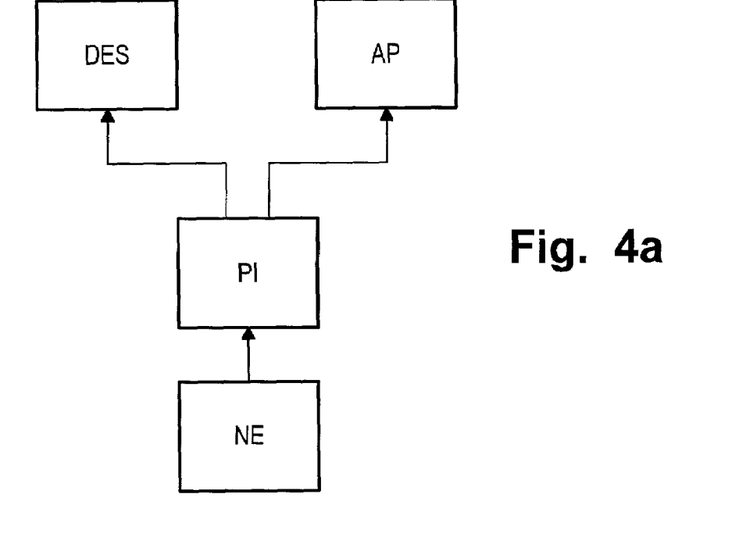

In the example of FIG. 4*a*, a the protocol interceptor PI is a separate device. Messages from a network element NE are sent to the protocol interceptor PI that duplicates the message and forwards one copy as a trigger to the application AP subscribed for this kind of triggers and one copy to the recipient DES as originally designated in the messages. The destination DES can be another network element or a network management system or the like.

This is the most flexible approach. It allows for network architectures whereby the protocol interceptor function is shared by multiple network elements and multiple separate application platforms.

Neither the network elements nor the application platform have to take into account the complexity of duplicating and modifying protocol messages. The only drawback is that an additional device has to be introduced in the network.

Figure 4B:
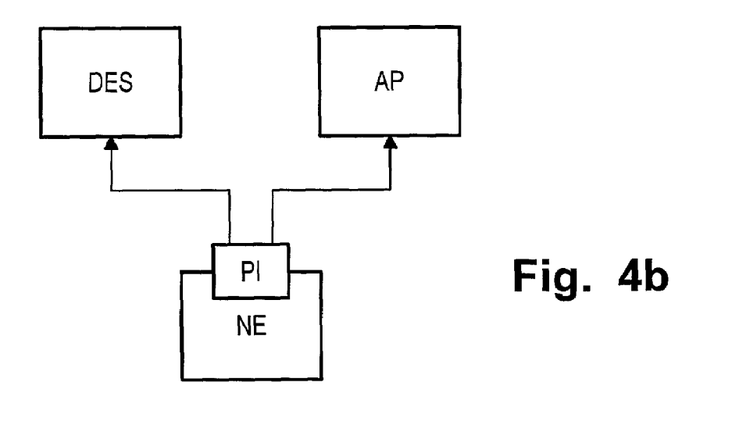

In FIG. 4*b*, the protocol interceptor PI function is integrated in the network element NE. This approach places the burden on the network element. Actually it shifts the problem entirely to the network element, while a basic idea of the present invention is to be able to deal with network elements that do not offer a sufficiently flexible protocol interface. Therefore the approach is the least attractive of the three. Nevertheless, for sake of completeness we suggest it is covered.

Figure 4C:
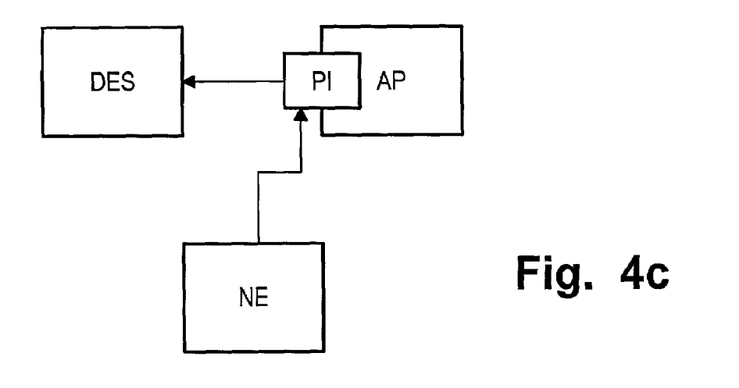

In FIG. 4*c*, the protocol interceptor PI function integrated in the application platform AP. This can be considered as the software equivalent of the first approach as shown in FIG. 4*a*. Instead of running the protocol interceptor PI logic on a separate device in the network, it is incorporated as a software component in the application platform AP. Since the function of intercepting, rerouting, and modifying protocol messages was encountered in first the instance in the context of an application platform, it is quite logical to position the corresponding new functionality as a new component in this application platform AP. In other words, this is probably the most attractive solution. It can be used to intercept protocol messages from different network elements, and forward them to the necessary legacy network components, while at the same time extracting the required information to enable value added services and applications.

Figure 5:
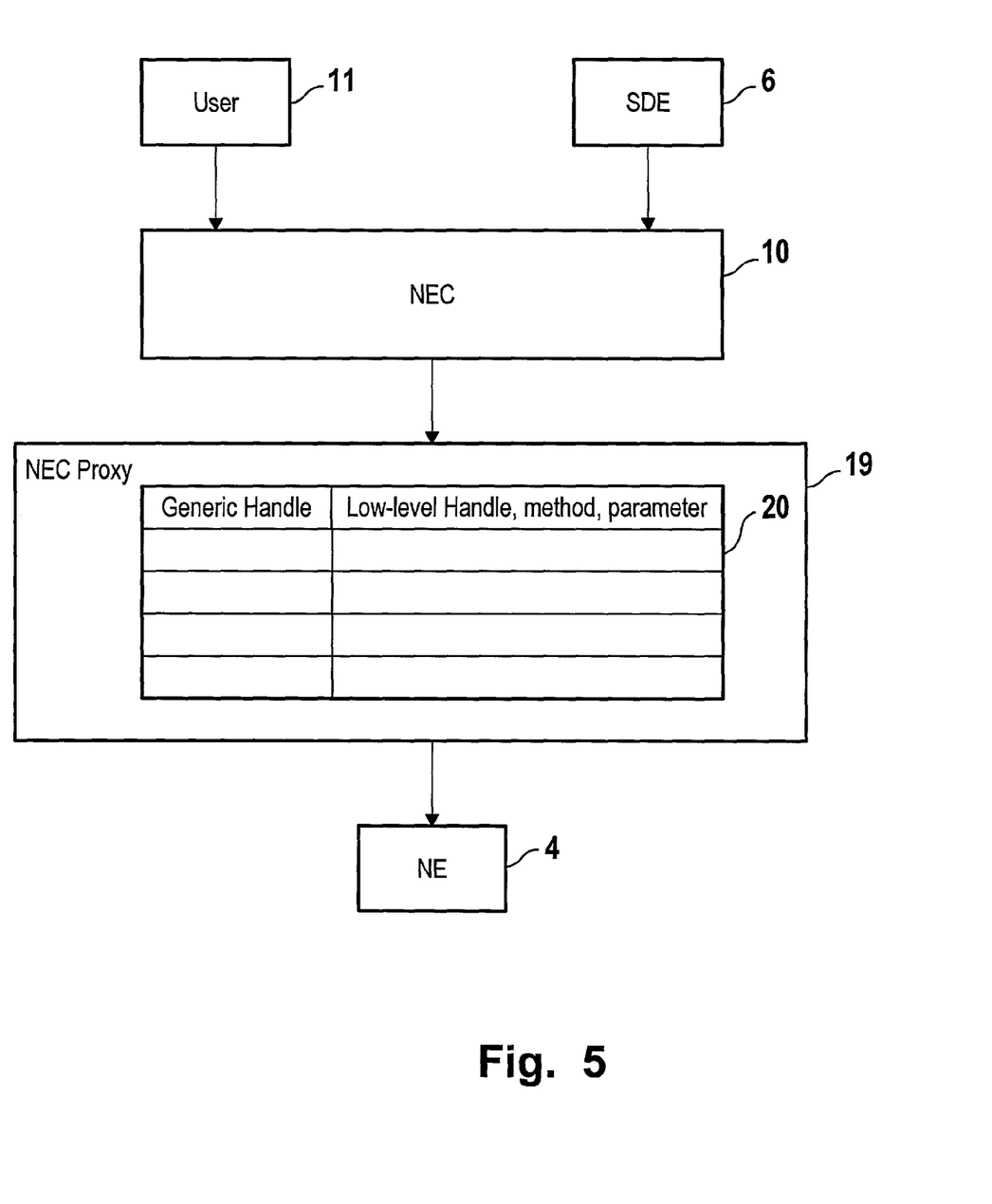
FIG. 5 is illustrative of an embodiment of a method for configuring a network element in accordance with the invention.

FIG. 5 shows a block diagram of an alternative embodiment of the invention where like elements are designated by the same reference numbers as in the FIGS. 1 and 3.

The SDE 6 of FIG. 5 can connect to network element controller (NEC) 10 as in the embodiments of FIGS. 1 and 3. However, user 11 can also directly trigger the configuration of a network element, such as its CP gateway, from the NEC 10. When the NEC 10 receives a request for configuration of a network element from SDE 6 or from user 1 the NEC 10 connects to the NEC proxy 19. The NEC proxy 19 contains a table 20 for mapping a generic handle received from the NEC 10 as part of the request for configuration of the network elements to a low-level handle, method and/or parameter which can be interpreted by the network element 4. Alternatively an even more flexible approach can be employed based on transformations of XML data structures. Preferably there is one NEC proxy 19 for each type of network element 4 such that one NEC proxy 19 can handle a large number of network elements 4 of the same type.

Preferably, the so called "triggers and handles" concept is used in the system of FIG. 5: Triggers and handles are closely linked to network elements. Triggers and handles abstract pieces of information exchanged between service logic and network elements.

A trigger is a notification containing pieces of data sent by a network element to the service logic upon occurrence of a specific network event. Triggers are thus a way for network elements to provide information that can be used by service logic and that, somehow, participate in value added services visible to end-users. Examples of triggers are presence triggers used by service logic for billing, for advertisement, etc.

A handle is a command sent by the service logic to a network element. These commands most of the time request the network element to execute some actions (configurations of Quality of Service (QoS)), set-up of connections, update a router table, etc.) the network element is capable of among all its networking capabilities. Handles can as well contain useful information. Handles are thus a way to drive network resources for the benefit of a service platform.

An application belonging to the service logic can be completely based on triggers and handles. For example, this application could wait indefinitely for triggers from a list of well known triggers. It sends out a specific handle when it receives a specific trigger. If the handle executes successfully, new triggers may be available to the application and so on. Triggers and handles can be provided by elements in existing network protocols from the moment they fit in the definition given above but they can also be provided independently of existing network protocols (especially when new triggers or handles are required but not already supported in existing protocols) and have a customized construct starting from information contained in or features of existing network protocols.

This concept can be materialized as a standard, vendor independent interface between service platforms and network elements. This interface should provide as well the semantic of triggers and handles plus the syntax for a language whose purpose is the description of triggers and handles. The main requirement for this language is that it should allow easy definition of new triggers and handles. The main requirement for the triggers and handles semantic is that it can easily be interpreted by applications or network elements in order for them to identify unambiguously a trigger or handle. The newly defined interface is transported over either an existing or a new communication protocol (e.g. SIP).

The advantages of triggers and handles are as follows:

clear communication interface to control and manage various types of messages between network elements and applications.

Triggers and handles hide network-specific events, commands to the application and triggers and handles syntax allows one to describe triggers and handles in a vendor independent way. Hence, the application does not have to be aware of the vendor-specific implementation aspects of the network element.

Examples for triggers include presence triggers from BRAS, ADSL modems, radius accounting triggers from BRAS to SMC, user security violation trigger, user session time expiration trigger.

Examples for handles include handles for service selection on BRAS via RAS protocols (e.g. request the BRAS to dial out to a user terminal, request the BRAS to switch to a different VPN at PPPoE level, request the BRAS to reconfigure its routing table to support simultaneous connectivity to two different VPN's, etc); handles to an ADSL modem to set-up bridges (for PPPoE clients), PPP connections, NAT/PAT entries, VP/VC, etc.; handles to a DSLAM to set-up dynamically VP/VC (SVC's) via a management interface (e.g. SNMP); handles to set-up PPP connections on the user terminal.

Figure 6:
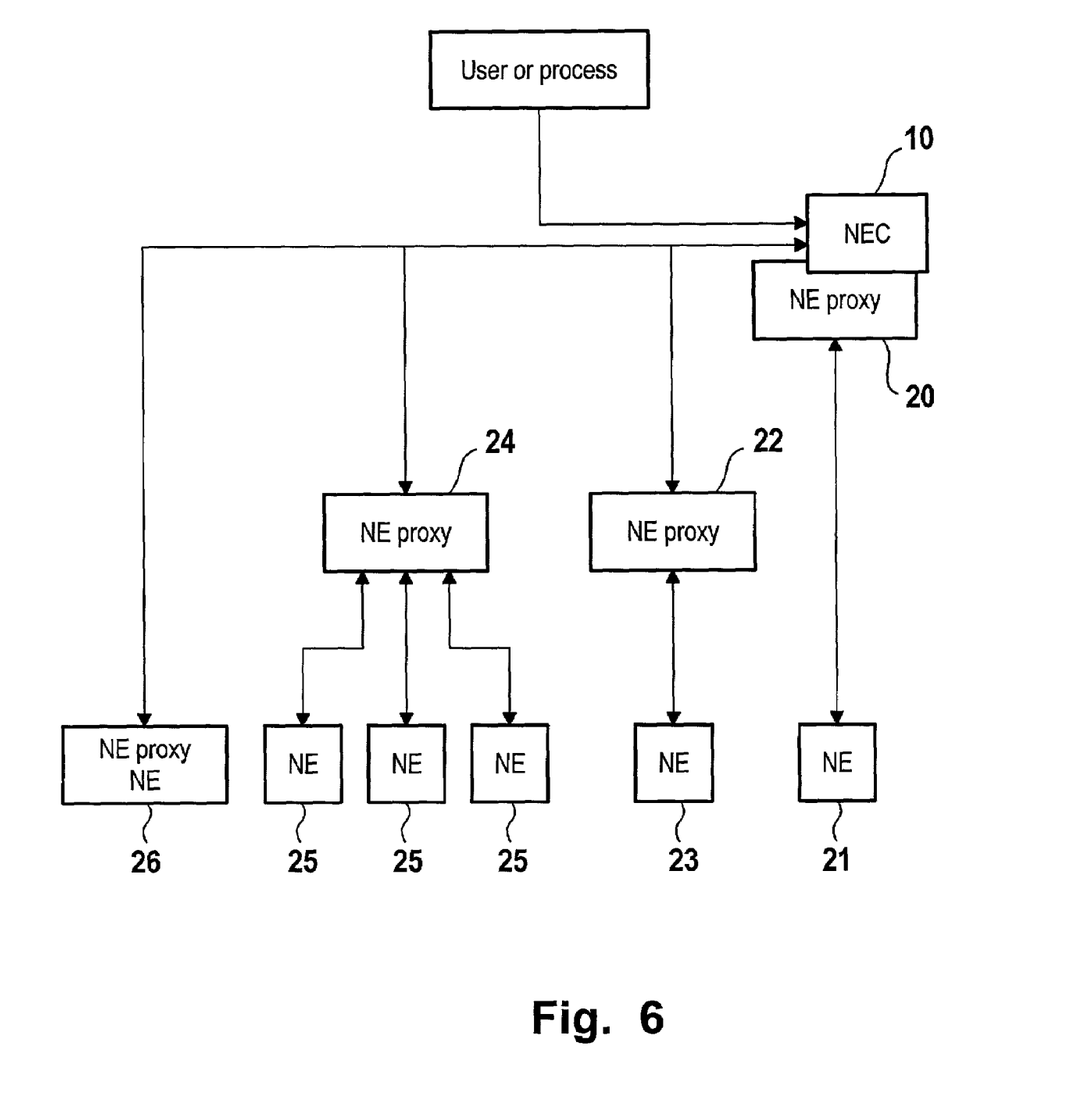
FIG. 6 is a block diagram illustrative of the configuration of a network element through the intermediary of a network element proxy.

FIG. 6 shows a block diagram illustrating various options for implementation of network element proxies. The network element controller 10 itself can contain a network element proxy 20 which serves a single network element 21.

Alternatively, the network element proxy can be realized as a separate entity—network element proxy 22—which also has just one associated network element 23 or it can be implemented as a separate network element proxy 24 for a plurality of network elements 25.

As a further alternative, the network element proxy can also form an integral part of the network element itself as it is the case with respect to network element 26 which is coupled to NEC 10.

The configuration of one of the network elements 21, 23, 25 or 26 through the intermediary of the corresponding network element proxy is triggered by a corresponding user request or a process received by the NEC 10. The process can be the transmission of a corresponding handle from the SDE 6 (cf. FIGS. 1, 3) to the NEC 10. It is important to note that the handles are not sent directly to the corresponding network elements but to the network proxy of the network element which is addressed by the handle. This network element proxy translates the generic handles to lower-level handles, methods and parameters of the NE involved.

A network element controller typically handles network elements of one specific type such as CP gateways, DSLAM or BRAS. The NE proxies (or agents) translate the NE specific handles to the actual type of NE. The NEC deals with addressing and thus offers a "topological" view on the NEs involved. Each NE proxy handles NEs at a certain location, area or network segment and it translates the generic handles to NE specific actions.

Figure 7:
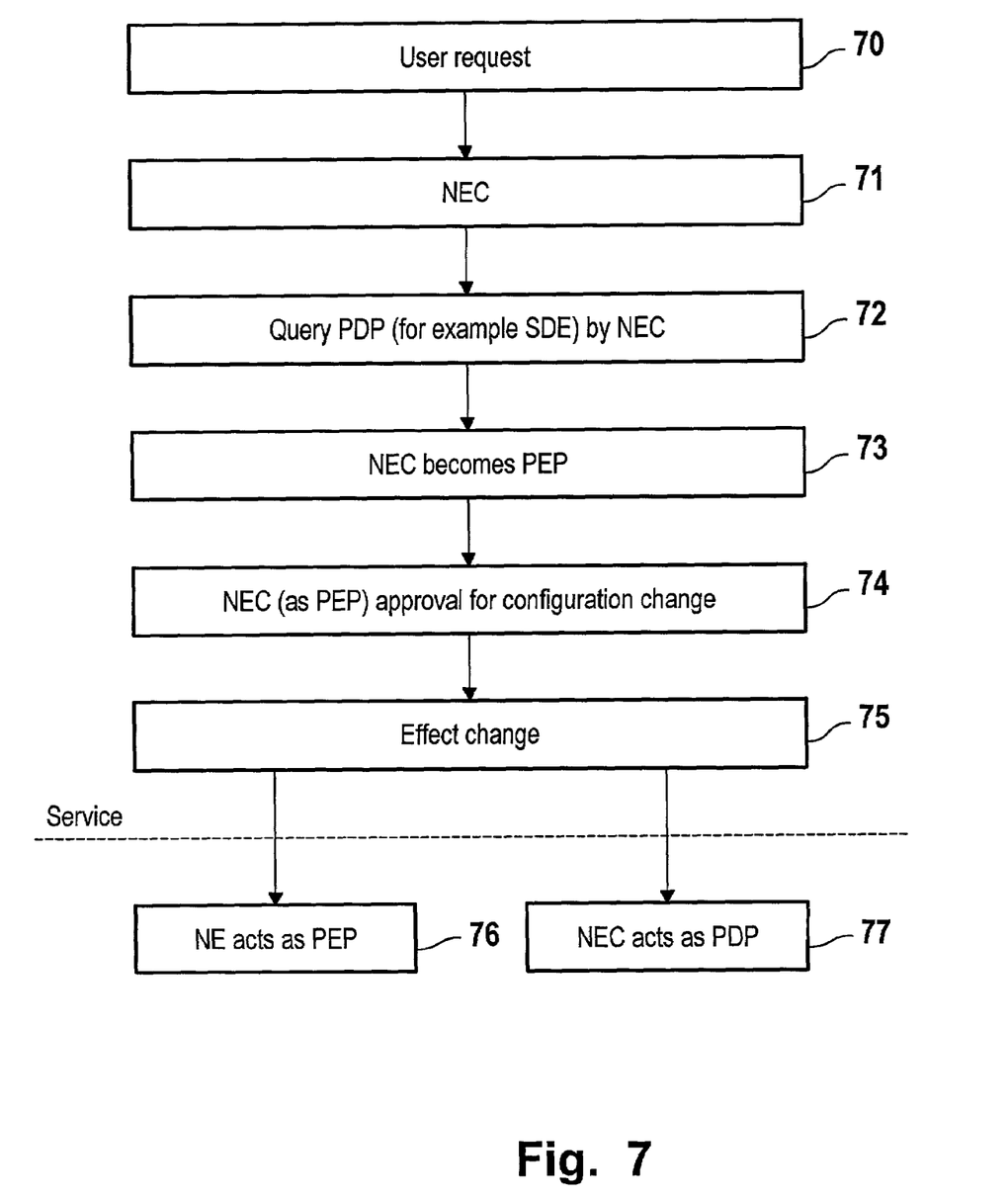
FIG. 7 is a flowchart illustrative of the usage of policy decision and policy enforcement points for the automatic configuration of a network element through a network element proxy.

The policy framework as under definition in the IETF defines a policy enforcement point (PEP) that cooperates with a policy decision point (PDP) to enforce policies on a service. In the embodiment of FIG. 7, the policies for configuration of network elements are enforced by the NEC:

In step 70 a user request is made for configuration. Alternatively the request can be made by a process or by a SDE (cf. FIGS. 1 and 3).

In step 71 the NEC receives a corresponding handle specifying the network elements to be configured and the kind of configuration and/or reconfiguration.

In step 72 the NEC consults a policy decision point (PDP) for the applicable policy. In step 73 the NEC becomes the policy enforcement point (PEP) for the policy as determined in step 72. For example an SDE can act as a PDP.

In step 74 the NEC approves the requested configuration change in its role as a PEP. In step 75 this change is effected through the intermediary of the appropriate NE proxy.

After step 75 the requested service can be provided to the user. During the provision of the service the NE acts as a PEP in step 76 and the NEC acts as PDP in step 77.

The above embodiment is advantageous in that it facilitates a seemless integration of user-initiated configuration changes of the invention with the IETF policy framework.

Figure 8:
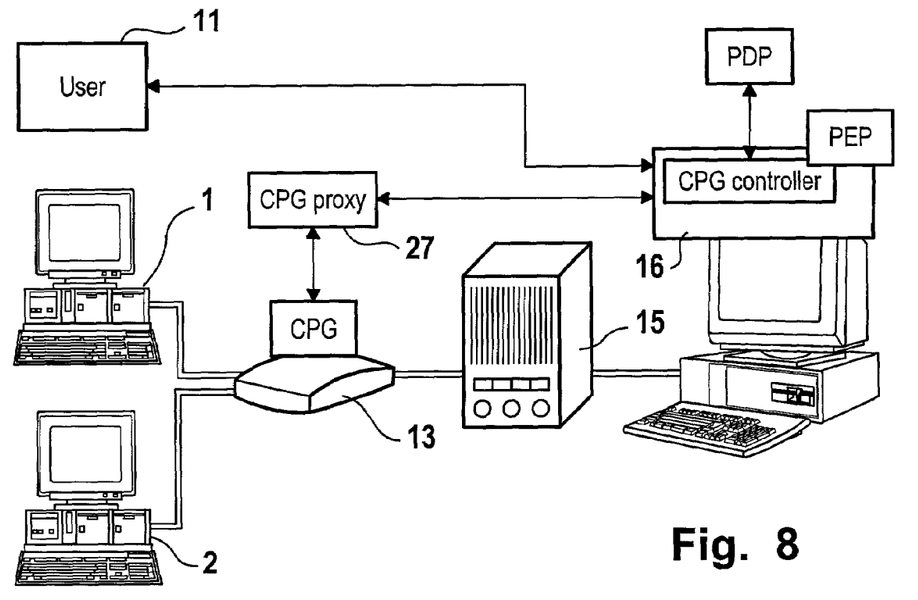
FIG. 8 is illustrative of a policed change to a service policy and/or configuration at a customer premises gateway.
Figure 9:
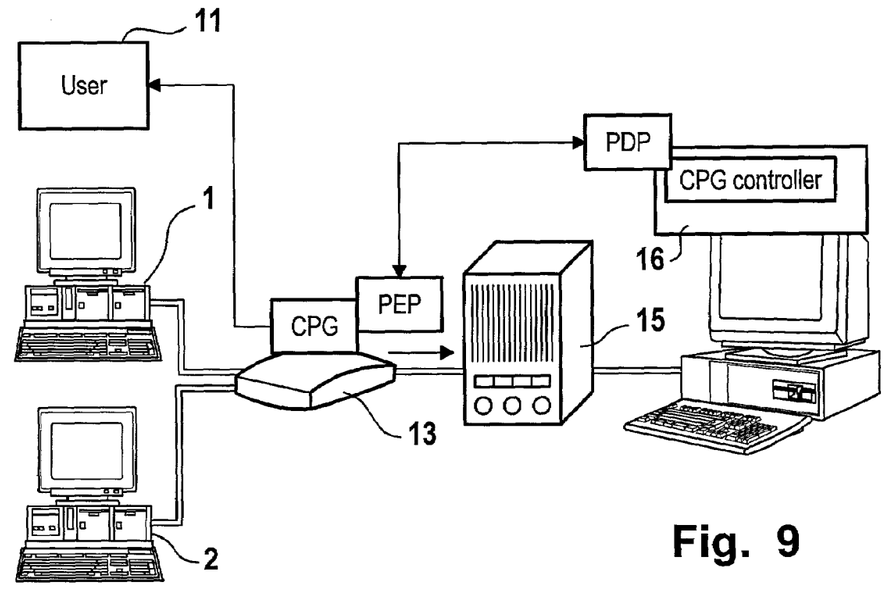
FIG. 9 is illustrative of the configuration of the system of FIG. 8 after the change has been effected.

FIGS. 8 and 9 show block diagrams of illustrative embodiments of the method of FIG. 7. Again like elements are denoted by the same reference numerals as in FIGS. 1 and 3.

In the system of FIG. 8 the CP gateway controller 16 takes the role of a PEP during the configuration phase of the CP gateway 13. Another entity, such as a SDE takes the role of a PDP. The configuration of the CP gateway 13 is done by the CP gateway controller 16 through the intermediary of the CP gateway proxy 27.

After the configuration of the CP gateway 13 the CP gateway 13 takes the role of a PEP whereas the CP gateway controller 16 takes the role of a PDP as it is illustrated in FIG. 9.

Figure 10:
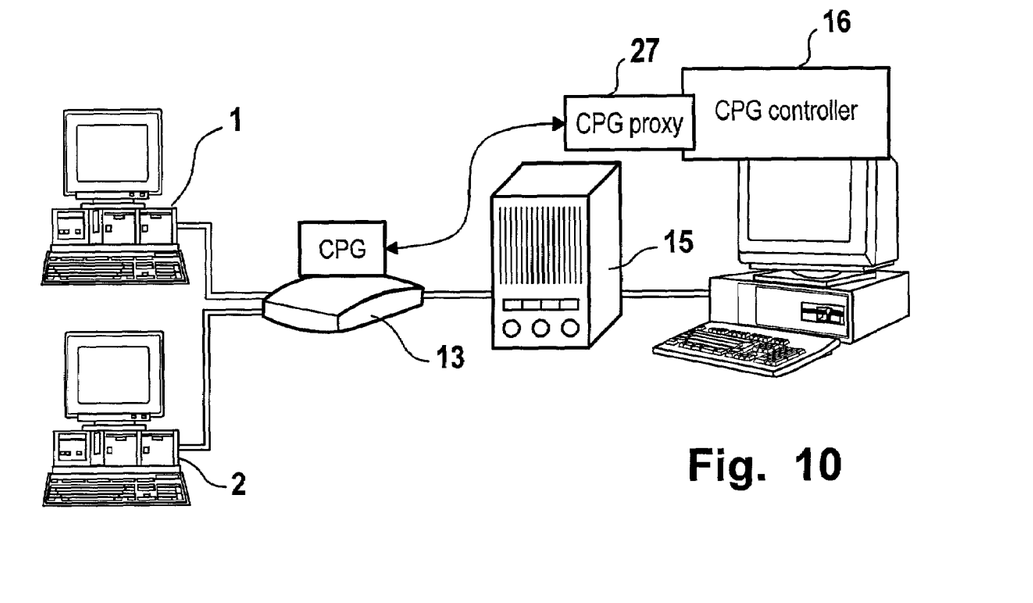
FIG. 10 is illustrative of a policed change, where the network element proxy resides on the network element controller.
Figure 11:
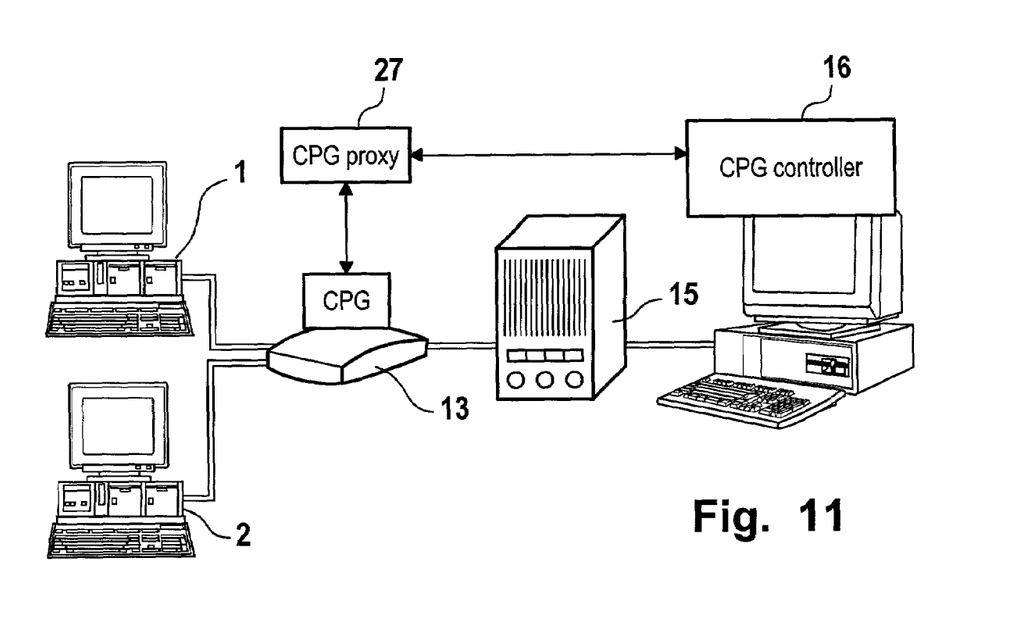
FIG. 11 is illustrative of an embodiment where the network element proxy is residing on the network element itself.
Figure 12:
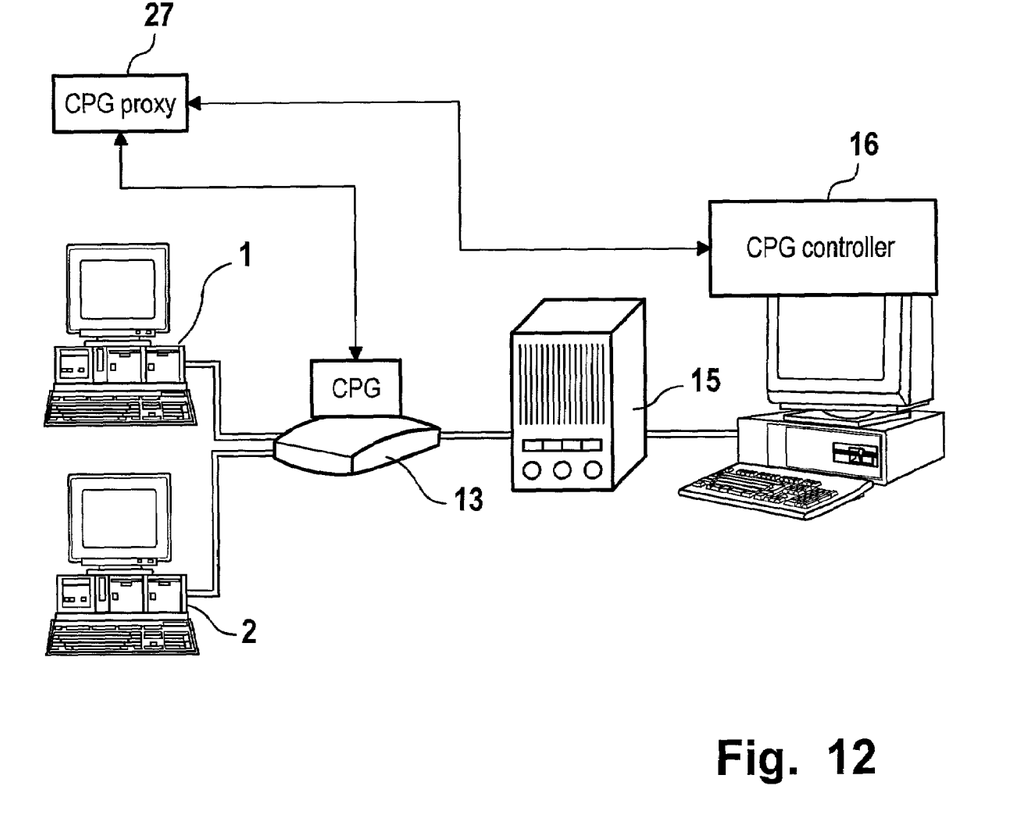
FIG. 12 is a further embodiment where the network element proxy is realized as a separate entity.

The following FIGS. 10, 11 and 12 illustrate how the CP gateway proxy can be placed on different network entities. The example of FIGS. 10, 11 and 12 is not restricted to the application for the CP gateway proxy but shows the flexibility in distributing network elements proxy functionality which allows leveraging the installed base of network elements and to involve them in added value service scenarios.

In the example of FIG. 10 the CP gateway proxy 27 forms an integral part of the CP gateway controller 16 whereas in the example of FIG. 11 the CP gateway proxy 27 is integrated within the CP gateway 13 itself. In the example of FIG. 12 the CP gateway proxy 27 is implemented on one of the user terminals of client computers 1 and/or 2.

It is to be noted that a further potential field of application of the present invention is within the framework of the open services gateway initiative (OSGi) which is standardizing the development of services on small embedded devices at the customer premises.

The invention claimed is:

1. A method for configuring a network element in a network having at least one network controller and a plurality of network elements with each network element having a network element type, the method comprising the steps of:

providing a plurality of network element proxies each between said network element controller and a respective group of multiple said network elements, with each network element within a group being of the same type as other network elements within its group, sending a configuration command from the network element controller to said network element proxies, translating the configuration command at said network element proxies into a lower level format for the configuration of the network elements to be configured, providing the lower level format of the configuration command to the network elements to be configured.

2. The method of claim 1 wherein the step of translating comprises a step of accessing a database within the network element proxy for mapping the configuration command onto the lower level format, the lower level format preferably comprising a low-level handle, parameter and/or method.

3. The method of claim 1, wherein the network element proxy is provided as an integral part of said network element controller.

4. A method in accordance with claim 1 further to comprising the steps of:
   determining a deployment policy from a policy decision point, such as a service deployment engine, by the network element controller,
   assigning the role of a policy enforcement point to the network element controller,
   approving the requested configuration by the network element controller,
   assigning the role of a policy enforcement point to the network element and assigning the role of a policy decision point to the network element controller after the configuration of the network element has been effected.

5. A distributed computer system comprising means adapted for carrying out the steps of claim 1.

6. A computer program product stored on a computer usable medium, such as on a data file for transmission over the internet, comprising computer readable program means for causing a distributed computer system, such as a computer system comprising at least one network element, a web-site or protocol interceptor, a service deployment engine and at least one network element controller, to perform a method according to claim 1 when the program is run on the distributed computer system.

7. The method of claim 1, wherein said network element proxy is provided as a separate entity interposed between said network element controller said group of network elements.

8. The method of claim 1, wherein said network element proxy is provided as an integral part of each network element in said group.

* * * * *